United States Patent
Raviv et al.

(10) Patent No.: US 10,129,276 B1
(45) Date of Patent: Nov. 13, 2018

(54) METHODS AND APPARATUS FOR IDENTIFYING SUSPICIOUS DOMAINS USING COMMON USER CLUSTERING

(71) Applicant: EMC IP Holding Company LLC, Hopkinton, MA (US)

(72) Inventors: Kineret Raviv, Herzeliya (IL); Carmit Sahar, Tel-Aviv (IL); Eyal Kolman, Tel-Aviv (IL); Shay Amram, Holon (IL); Alon Kaufman, Bnei-Dror (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 15/083,899

(22) Filed: Mar. 29, 2016

(51) Int. Cl.
  G06F 21/50 (2013.01)
  H04L 29/06 (2006.01)

(52) U.S. Cl.
  CPC ...... H04L 63/1425 (2013.01); H04L 63/0236 (2013.01)

(58) Field of Classification Search
  None
  See application file for complete search history.

(56) References Cited

U.S. PATENT DOCUMENTS

| | | | | |
|---|---|---|---|---|
| 8,769,646 | B2 * | 7/2014 | Robert | G06F 21/41 713/155 |
| 8,788,407 | B1 * | 7/2014 | Singh | G06F 17/30412 705/35 |
| 9,264,442 | B2 * | 2/2016 | Bart | H04L 63/1425 |
| 9,516,053 | B1 * | 12/2016 | Muddu | H04L 63/1425 |
| 9,710,646 | B1 * | 7/2017 | Zhang | G06F 21/56 |
| 9,749,336 | B1 * | 8/2017 | Zhang | H04L 63/14 |

(Continued)

FOREIGN PATENT DOCUMENTS

| | | | | |
|---|---|---|---|---|
| EP | 2814218 A1 * | 4/2014 | | H04L 29/06 |
| WO | WO 2015/014279 A1 * | 5/2015 | | G06F 17/30 |

OTHER PUBLICATIONS

RSA Solution Overview, RSA Security Analytics and Big ata, Aug. 2014, pp. 1-4.

*Primary Examiner* — Christopher Revak
(74) *Attorney, Agent, or Firm* — Ryan, Mason & Lewis, LLP (57) ABSTRACT

Methods and apparatus are provided for identifying suspicious domains using common user clustering. An exemplary method comprises obtaining network event data comprising a plurality of network connections; identifying users and domains associated with the network connections in the network event data; creating a connection between each user/domain pair that communicate with one another in the identified users and the identified domains to generate a graph; connecting domains in the graph using inter-domain edges that share common users to obtain a graph of interconnected domains; identifying bi-connected components in the graph of interconnected domains, wherein the bi-connected components comprise node pairs having at least two paths in the graph of interconnected domains between them; and processing the bi-connected components to identify a plurality of suspicious domains that are likely to participate in a computer security attack. The graph of interconnected domains is optionally pruned and/or filtered to remove one or more inter-domain edges.

20 Claims, 5 Drawing Sheets

(56) References Cited

U.S. PATENT DOCUMENTS

| | | | |
|---|---|---|---|
| 2012/0084860 A1* | 4/2012 | Cao | H04L 63/1441 726/23 |
| 2018/0124020 A1* | 5/2018 | Rodriguez | H04L 63/1425 |
| 2018/0152468 A1* | 5/2018 | Nor | H04L 43/0876 |

* cited by examiner

METHODS AND APPARATUS FOR IDENTIFYING SUSPICIOUS DOMAINS USING COMMON USER CLUSTERING

FIELD

The field relates generally to computer security techniques, and more particularly to techniques for identifying suspicious domains associated with computer security attacks, such as malware and phishing attacks.

BACKGROUND

Malware (i.e., malicious software) and phishing are common computer security risks. Malware is software used to disrupt computer operations, gather sensitive information, and/or gain access to a computing device. Malware on a user computing device often obtains further instructions to execute on the computing device from a destination server or provides obtained data from the computing device to the destination server. It is noted that the information obtained by malicious actors is often stored on a destination server referred to as a "drop point." Phishing attempts to obtain sensitive information, such as user names, passwords and/or financial details, typically for malicious reasons, by impersonating a trustworthy entity on a destination server in an electronic communication. Malware and phishing attacks are performed by an attacker (e.g., an individual or an entity) that hopes to obtain personal and/or sensitive information or to access a computing device.

The destination servers that participate in, or are likely to participate in, computer security attacks, such as malware and phishing attacks, are often referred to as suspicious domains or malicious domains. In addition, users can often inadvertently navigate to a suspicious domain using his or her browser. A need exists for improved techniques for identifying such suspicious domains.

SUMMARY

One or more illustrative embodiments of the present invention provide methods and apparatus for identifying suspicious domains using common user clustering. In one exemplary embodiment of the invention, a method is provided comprising the steps of obtaining network event data comprising a plurality of network connections; identifying users and domains associated with the network connections in the network event data; creating a connection between each user/domain pair that communicate with one another in the identified users and the identified domains to generate a graph; connecting domains in the graph using inter-domain edges that share common users to obtain a graph of interconnected domains; identifying bi-connected components in the graph of interconnected domains, wherein the bi-connected components comprise node pairs having at least two paths in the graph of interconnected domains between them; and processing the bi-connected components to identify a plurality of suspicious domains that are likely to participate in a computer security attack.

In one or more embodiments, the graph of interconnected domains is pruned by removing one or more of inter-domain edges between two nodes that do not have a similar predefined common property value and inter-domain edges based on an edge strength. In at least one embodiment, the graph of interconnected domains is filtered by removing one or more of inter-domain edges comprising nodes having zero intersection of neighbors and inter-domain edges comprising node pairs that are not bi-connected components having at least two paths between them.

In one exemplary embodiment, each of the connections between each user/domain pair is optionally annotated with an indication of whether events associated with a given connection are associated with (i) beaconing communications; (ii) a predefined number of HTTP requests; and/or (iii) predefined off-work hours.

The methods and devices of the illustrative embodiments overcome one or more of the problems associated with conventional techniques, and provide common user-based clustering of domains to identify suspicious domains associated with potential computer security attacks (e.g., phishing and/or malware attacks). These and other features and advantages of the present invention will become more readily apparent from the accompanying drawings and the following detailed description.

DETAILED DESCRIPTION

Illustrative embodiments of the present invention will be described herein with reference to exemplary communication systems, computing devices, and associated servers, clients and other processing devices. It is to be appreciated, however, that the invention is not restricted to use with the particular illustrative system and device configurations shown.

In one or more embodiments, a detection algorithm is provided that identifies one or more groups of suspicious domains. As used herein, a suspicious domain (also referred to as a malicious domain) comprises a destination server that participates in, or is likely to participate in, computer security attacks, such as malware and phishing attacks. In addition, users can often inadvertently navigate to a suspicious domain using his or her browser.

In at least one embodiment, an exemplary domain clustering process identifies groups of domains that are likely to be used as suspicious domains, and provides analysts with an opportunity to further investigate the identified suspicious domains. One or more embodiments of the exemplary domain clustering process identify suspicious domains based on their communication behavior, and their similarity to other domains. The exemplary approach is proactive and can identify risky activity that may be missed by other, signature-based solutions.

According to one aspect of the invention, automatic and adaptive data-driven, graph-based detection of suspicious domains is provided. In this manner, new suspicious domains can be detected quickly, without the need for extensive human labor. In at least one embodiment, the exemplary domain clustering process creates small domains clusters that communicate with the same users (identified, for example, by source IP addresses), and have a common property (such as a suspicious domain score), as discussed further below. In addition, once a new suspicious domain is identified, an analyst can investigate and label all the neighbors of the identified suspicious domain.

As will be described, the present invention, in one or more illustrative embodiments, provides methods and apparatus for domain clustering of communication data to identify small domains clusters that communicate with the same users and have another common property. In one or more exemplary embodiments, network event data is analyzed to extract user/domain pairs (FIG. 4) that communicate with one another. An exemplary domain clustering process 300, as discussed further below in conjunction with FIG. 3, then identifies interconnected domains (FIG. 5) and bi-connected domains (FIG. 6) corresponding to the small domains clusters comprising suspicious domains.

Figure 1:
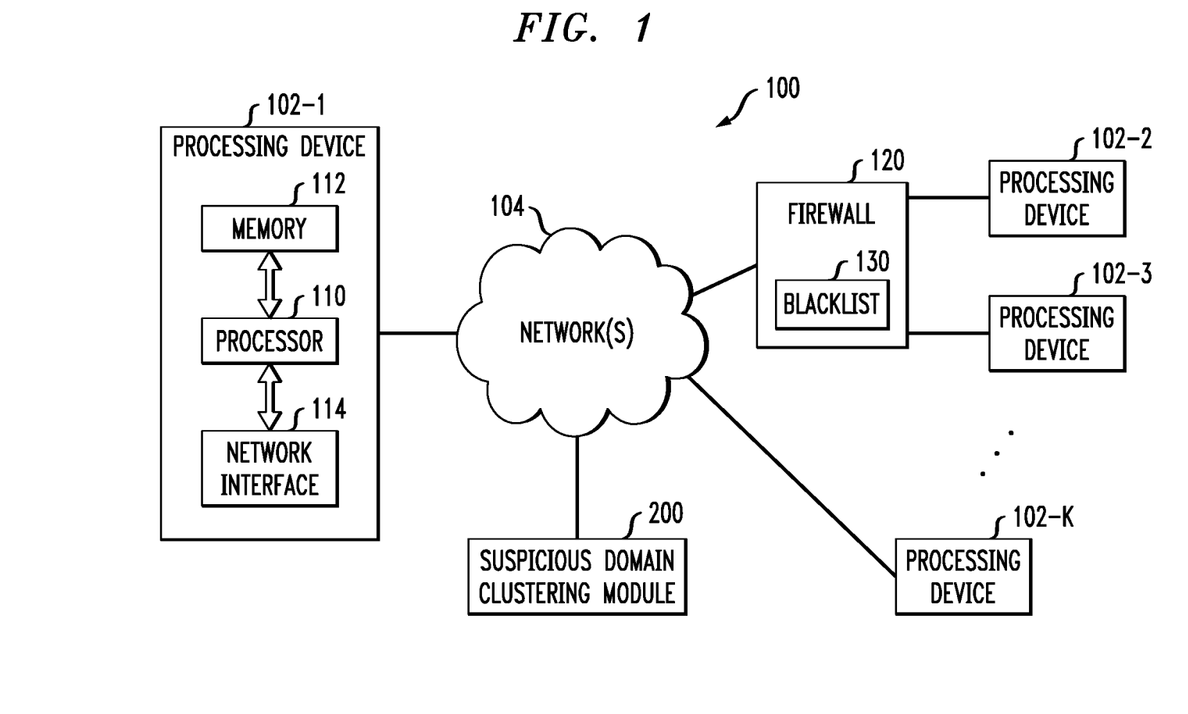
FIG. 1 illustrates an exemplary network environment in which the present invention can be implemented.

FIG. 1 illustrates an exemplary network environment 100 in which the present invention can be implemented. As shown in FIG. 1, the exemplary network environment 100 comprises a plurality of processing devices denoted by 102-1 through 102-K that communicate with one another over one or more networks 104. The network 104 may comprise any type of network, such as a WAN, a LAN, a satellite network, an enterprise network, a telephone or cable network, or various portions or combinations of these and other types of networks.

The exemplary processing device 102-1 comprises a processor 110 coupled to a memory 112. The processor 110 may comprise a microprocessor, a microcontroller, an ASIC, an FPGA or other type of processing circuitry, as well as portions or combinations of such circuitry elements, and the memory 112, which may be viewed as an example of a "computer program product" having executable computer program code embodied therein, may comprise RAM, ROM or other types of memory, in any combination.

Also included in the processing device 102-1 is network interface circuitry 114, which is used to interface the processing device with the network 104 and other system components, and may comprise conventional transceivers.

The other processing devices 102-2 through 102-K are assumed to be configured in a manner similar to that shown for processing device 102-1 in FIG. 1.

As shown in FIG. 1, one or more suspicious domain clustering modules 200 are provided, as discussed further below in conjunction with FIG. 2. In addition, one or more of the processing devices 102, such as processing device 102-1, may comprise a destination server of a suspicious domain.

One or more of the processing devices 102, such as processing devices 102-2 and 102-3, may be behind a firewall 120 that blocks communications, for example, based on a blacklist 130. Generally, a blacklist 130 (or block list) is an access control mechanism that allows elements (e.g., email addresses, users, passwords, URLs, IP addresses and domain names) to pass, except those explicitly blocked on the list.

In an enterprise network, enterprise organizations often employ a firewall 120 (or similar network appliance) to restrict network communications for network users to only essential protocols, with the leading one being the Hypertext Transfer Protocol (HTTP). While firewall applications are very effective at blocking or allowing certain types of communications, their ability to detect potential threats inside the allowed protocol is typically limited to signatures and category rule based inspection. With HTTP being extremely popular and used for virtually everything online, it is no surprise that many of the security threats to an organization are from the web, via HTTP.

Thus, one of the most common defense approaches is blocking communications to suspicious domains, for example, using one or more blacklists 130 implemented by one or more firewalls 120. Nonetheless, blacklists 130 are notorious for containing many benign domains (e.g., domains that were malicious years ago) and require a lot of human labor to generate and maintain them. Also, blacklists 130 only contain domains that were manually detected as malicious or suspicious and therefore new malicious or suspicious domains would often not be included in the blacklists 130.

Suspicious domains are often considered a weak link in an attack pattern, since blocking the communication from the enterprise to these domains might terminate the attack, even if valuable data was found on a processing device 102 within the enterprise network and waiting to be delivered to the destination server of the attacker. Therefore, many attackers use several malicious or suspicious domains for backup and robustness. One or more aspects of the invention recognize that these multiple domains behave similar to one another and the same infected processing devices 102 communicate with the multiple domains. One or more embodiments of the invention utilize this recognition for an automatic detection of small groups of similar domains, which might indicate that they are malicious or suspicious domains.

Organizations that are victims of computer security attacks often aim to identify the attackers and suspicious domains, in an attempt to reduce the business damage, monetary losses and/or damage to the business reputation. Thus, enterprises often employ blacklists 130 to block communications to suspicious domains. The suspiciousness of a domain is typically determined using existing blacklists 130 that are provided by several providers (e.g., Microsoft™, Cisco™, and Checkpoint™). A domain is traditionally marked as malicious, for example, by analyzing malware that communicates with this domain or by signature detection of files downloaded from the site. These methods require human labor, continuous updates, and fail to detect new malicious sites. It is known that even the best domain blacklists contain large amounts of false positives (i.e., benign domains) and therefore cannot be fully trusted, which poses a problem to the security analyst.

In one or more embodiments, a domain clustering process is provided to identify malicious or suspicious domains based on their communication behavior, and their similarity to other domains. This approach is proactive and designed to identify the risky activity that is likely to be missed by other, signature-based solutions.

Figure 2:
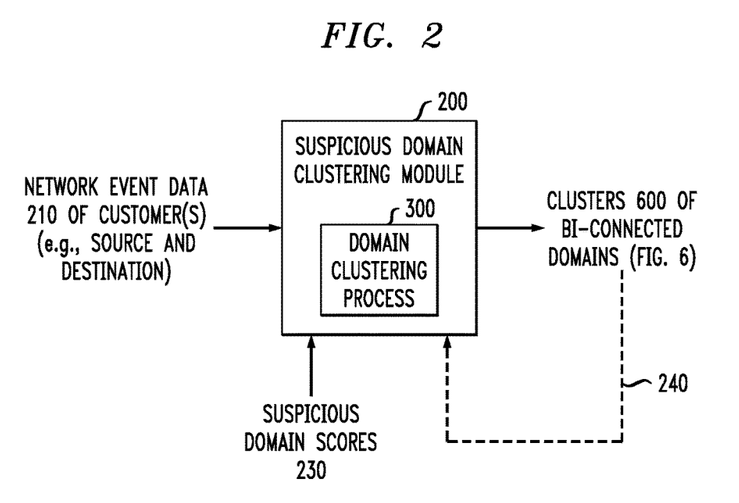
FIG. 2 illustrates an exemplary suspicious domain clustering module of FIG. 1 in accordance with one embodiment of the invention.

FIG. 2 illustrates an exemplary suspicious domain clustering module 200 of FIG. 1 in accordance with one embodiment of the invention. The exemplary suspicious domain clustering module 200 may be embodied as any kind of computing device, such as, for example, a personal computer, a workstation, a server, an enterprise server, a laptop computer, a mobile computer, a smart phone, and a tablet computer.

As shown in FIG. 2, the exemplary suspicious domain clustering module 200 processes network event data 210 of customer(s) (e.g., source and destination identifiers, such as IP address, username, and/or domain name) to identify user/domain pairs; as well as suspicious domain scores 230. In one or more embodiments, the exemplary network event data 210 comprises HTTP and HTTPS events that describe connections between users (e.g., by source IP addresses) and domains (or destination IP addresses). In at least one embodiment, the network event data 210 is annotated with additional attributes, discussed below, for filtering. The suspicious domain scores 230 can be obtained from a third party source. See, for example, "RSA Security Analytics and Big Data," RSA Security Inc. of Bedford, Mass., U.S.A., August 2014, incorporated by reference herein in its entirety. Typically, the suspicious domain scores 230 are a function of the number of users, number of devices, beaconing ratio, location, domain age, and whether the users are human or automated users.

As shown in FIG. 2, the suspicious domain clustering module 200 implements a domain clustering process 300, as discussed further below in conjunction with FIG. 3. The domain clustering process 300 generates clusters 600 of bi-connected domains, as discussed further below in conjunction with FIG. 6, corresponding to small domains clusters comprising suspicious domains. The clusters 600 can be used to update a blacklist 130 of suspicious domains or to make recommendations to an analyst to further evaluate the domains in the clusters 600. In this manner, the clusters 600 allow an analyst to evaluate a smaller number of domains or to otherwise prioritize the riskiest domains to investigate.

Figure 6:
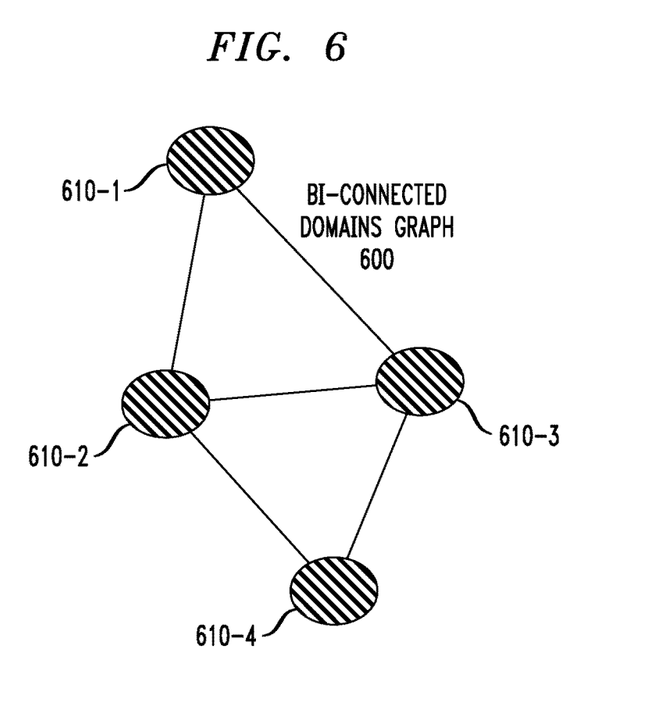
FIG. 6 illustrates an exemplary bi-connected domains graph generated by the domain clustering process of FIG. 3.

As discussed further below in conjunction with FIG. 3, the exemplary domain clustering process 300 creates small clusters 600 of domains that share the same users (identified, e.g., by source addresses) and have a common property, such as a suspicious domain score. Clusters 600 that satisfy a predefined size criteria comprise a plurality of suspicious domains that are likely associated with the same particular attacker. The suspicious domains in a given cluster 600 can be used, for example, to investigate one or more domains and to obtain additional information regarding a particular suspicious domain.

As shown by the dashed connection 240 in FIG. 2, the domain clustering process 300 is optionally an iterative process that can perform a re-clustering on new data, such as data for a new period of time (e.g., new event data 210 for a recent completed month) and/or a new client (e.g., new event data 210 for a new enterprise client).

Figure 3:
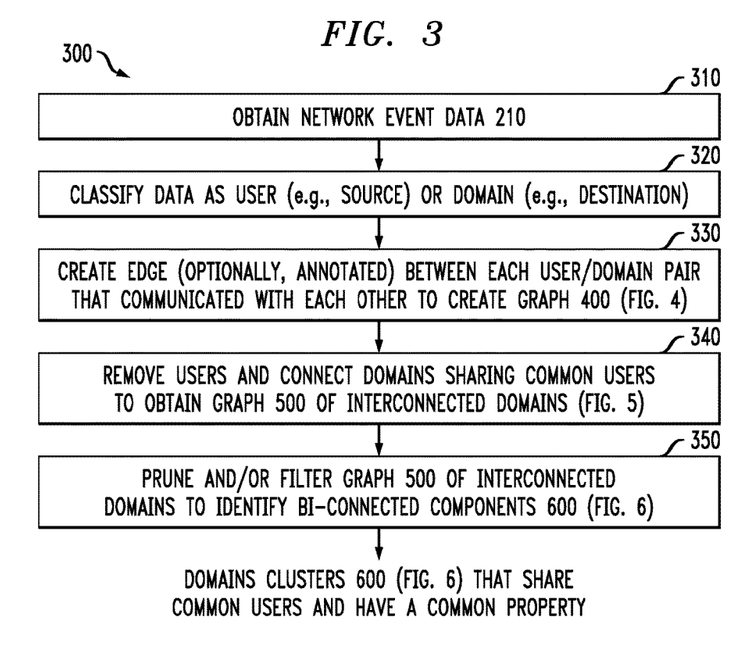
FIG. 3 is a flow chart illustrating an exemplary implementation of the domain clustering process, according to one embodiment of the invention.

FIG. 3 is a flow chart illustrating an exemplary implementation of the domain clustering process 300, according to one embodiment of the invention. As shown in FIG. 3, the exemplary domain clustering process 300 initially obtains network event data 210 during step 310. As noted above, the obtained network event data 210 (e.g., HTTP events) describe connections between users. For example, the Security Analytics™ product, commercially available from RSA Security Inc. of Bedford, Mass., U.S.A. Generally, Security Analytics™ records network traffic of one or more enterprise clients and identifies users by source IP address and domains by destination IP address. In further variations, the network event data 210 can be obtained using existing sniffer products and/or third party tools, such as IronPort® email and web security gateway and management products, currently referred to as Cisco Email Security and Cisco Web Security, from Cisco, Inc.

As shown in FIG. 3, the exemplary clustering process 300 classifies each data event as user (e.g., source) or domain (e.g., destination) during step 320. During step 330, an edge is created (optionally, annotated for filtering, as discussed below) between each user/domain pair that communicated with each other to create a graph 400, as discussed further below in conjunction with FIG. 4, with each user/domain pair connected by an edge.

Figure 4:
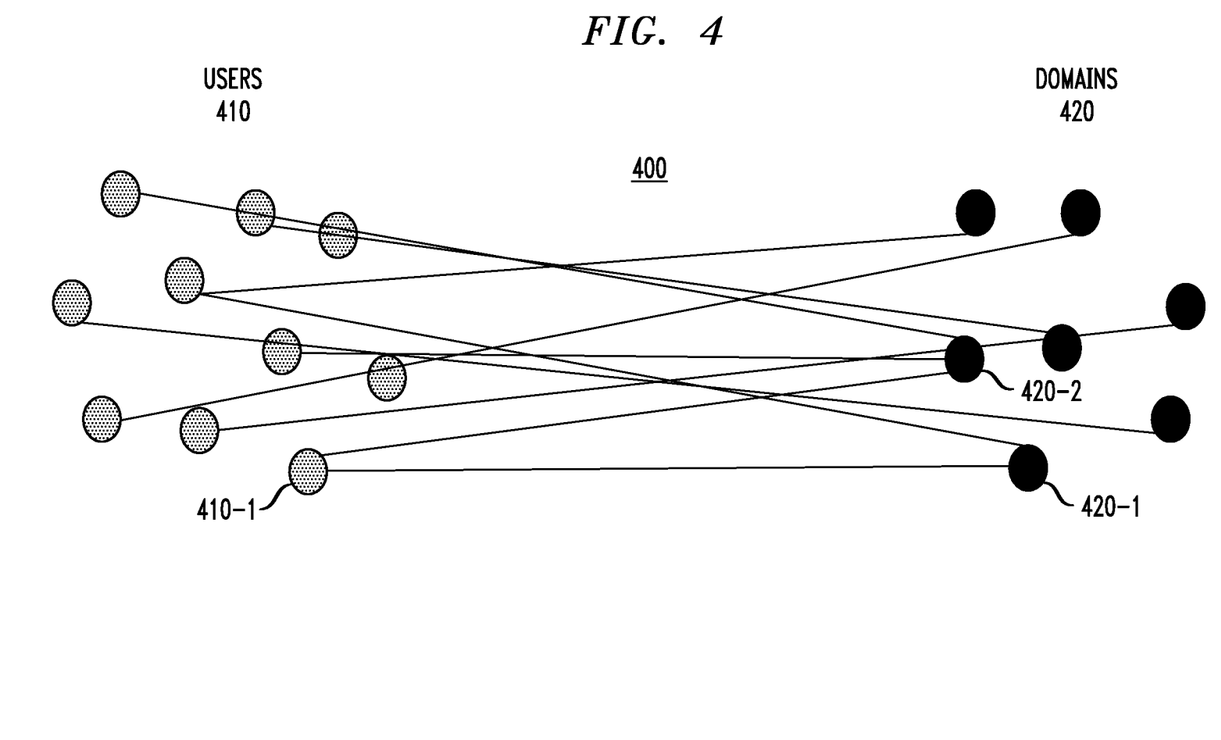
FIG. 4 illustrates an exemplary user/domain pair graph that is generated by the domain clustering process of FIG. 3.

In one or more embodiments, the edges created in the graph 400 from the exemplary obtained network event data 210 is annotated with additional attributes (e.g., for filtering). For example, the annotations can indicated whether a given event is associated with, for example: (i) beaconing communications (e.g., periodic communications which is a typical property of automatic communications, which are more suspicious); (ii) multiple HTTP requests; or (iii) off-work hours.

Users are removed during step 340, and domains sharing common users are connected to obtain a graph 500 of interconnected domains, as discussed further below in conjunction with FIG. 5. Thus, two destinations are connected if they have common users between them (e.g., the domains have previously communicated with common users). A number of techniques for generating inter-domain edges in the graph 500 are discussed further below in conjunction with FIG. 5.

Following step 340, a graph 500 of inter-connected domains is obtained. Typically, however, the graph 500 may be too dense. Thus, in order to find relevant clusters the inter-domain edges should be pruned. Thus, the graph 500 of interconnected domains is pruned and/or filtered during step 350 to identify bi-connected components 600, as discussed further below in conjunction with FIG. 6. As discussed further below, the pruning and filtering of edges can be performed using one or more rules and/or edge weights.

The exemplary clustering process 300 generates one or more domain clusters comprising bi-connected components 600 that share common users (e.g., having common source IP addresses), and have another common property (such as suspicious domain score 230).

FIG. 4 illustrates an exemplary user/domain pair graph 400 that is generated during step 330 of the domain clustering process 300 of FIG. 3. As noted above, during step 330, the clustering process 300 creates an edge (optionally, annotated) between each user/domain pair that communicated with each other, in order to create the graph 400 of FIG. 4. Generally, the clustering process 300 "draws" a connection (e.g., an edge) between each pair of users 410 and domains 420 that communicate with one another, effectively creating the bipartite graph 400 shown in FIG. 4.

Figure 5:
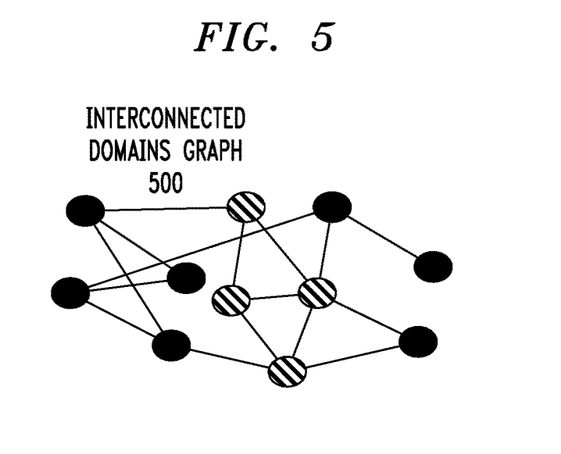
FIG. 5 illustrates an exemplary interconnected domains graph generated by the domain clustering process of FIG. 3.

FIG. 5 illustrates an exemplary interconnected domains graph 500 generated during step 340 of the domain clustering process 300 of FIG. 3. As noted above, during step 340, the domain clustering process 300 removes users from the graph 400 and connects domains sharing common users, in order to obtain the graph 500 of interconnected domains (shown in FIG. 5).

As noted above, a number of exemplary techniques are employed for generating the inter-domain edges in the graph 500 of FIG. 5. In one or more exemplary embodiments, one or more of the following rules are employed to remove the users 410 and draw connections between domains 420 that share common users:

Two domains are connected if they share at least X users (e.g., X=3);

Two domains are connected if they share at least Y % of their users; and/or

Two domains are connected if their Jaccard index (e.g., the ratio between cardinality of the intersection and union of the user's sets of the two domains) is larger than Z.

In addition, additional attributes can be added to the edges and be used for filtering. For example, only user-domain connections are considered that include beaconing communications, or have at least a predefined minimum number of HTTP requests, or are at off-work hours.

Further, the inter-domain edges can optionally have a weight, which is a function of one or more of the above proposals (e.g. a function of the number/percentage of common users/Jaccards index and additional attributes, including a function of the difference in their suspicious domain score 230).

As noted above, following step 340, a graph 500 of inter-connected domains is obtained. However, this graph 500 may be too dense. Thus, in order to find relevant clusters 600, the inter-domain edges should be pruned.

In one or more embodiments, edges are removed using the following exemplary conditions:

Edges are removed between two nodes (e.g., domains) that do not have a similar common property value (e.g., similar domain age or similar domain name). For example, if domain A has a suspicious domain score 230 of 0.6, and domain B has a suspicious domain score 230 of 0.9, their score difference exceeds a predefined threshold and is considered too high (thus, the edge is removed).

Alternatively, if the edge weights are a function of several attributes, then the edges can be pruned by edge strength. In one or more embodiments, edge strength is a function of a plurality of properties and indicates a similarity of the two domains associated with the edge. Generally, if the edge strength exceeds a predefined threshold, the edge is maintained.

Thereafter, inter-domain edges are filtered. Generally, the filtering verifies strong connection between two domains. In one exemplary implementation, inter-domain edges are filtered using the following rules:

Remove Local Bridges: A local bridge is an edge whose nodes have zero intersection of neighbors (there is no other path at length two to get from A to B). For example, for two domains A and B, if you can get from domain A to domain B, in only one way (i.e., directly), then the edge is removed. In other words, if there is only a single connection between domains A and B the edge is removed, but if there is any other path between domains A and B, then the edge is kept.

Keep Bi-Connected Components: keep nodes that are connected at least to two other nodes. Generally, bi-connected components comprise those domain pairs that have at least two paths connecting them. In this manner, isolated domains are removed.

In the exemplary graph 500 of FIG. 5, the nodes having a hash pattern survive the pruning and filtering and will form the graph 600 of bi-connected components, discussed below. In one or more embodiments, the bi-connected components comprise those components where every two nodes have at least two paths connecting them.

FIG. 6 illustrates an exemplary bi-connected domains graph 600 generated during step 350 of the domain clustering process 300. As noted above, during step 350, the exemplary domain clustering process 300 prunes and/or filters the graph 500 of interconnected domains to generate the graph 600 of bi-connected components.

Following the pruning and filtering of step 350, there is typically one relatively large cluster of domains (such as the frequently used Google™, Facebook™ and Twitter™ domains) that will contain most of the domains and many isolated (e.g., single) domains. The rest of the domains are clustered into relatively small groups which correspond to anomalous behavior. It can be shown that the domains in these clusters, such as the cluster of domains 610-1 through 610-4 in the bi-connected domains graph 600, are malicious and/or suspicious domains with a high probability.

In one exemplary implementation, each node has an associated tuple indicating a number of common users, and a suspicious domains score 230. For example, the domains 610-1 through 610-4 might have domain names of domainname3.com, domainname5.com and domainname7.com, as well as another domain having a distinct domain name, such as a misspelling of a common domain.

Among other benefits, one or more embodiments of the invention operate largely without human intervention due to the clustering techniques present in the domain clustering processes of FIG. 3. In addition, one or more embodiments of the invention aggregate large databases of network event data 210 of numerous entities making the domain clustering process 300 more accurate. By correlating the network event data 210 over time and across organizations, a larger amount of domain characteristics are obtained which might be useful for further investigation and/or cooperation with law enforcement agencies.

One or more exemplary embodiments of the invention allow an organization to focus their response efforts on those suspicious domains that are most likely to be malicious. With the ability to combine multiple suspicious domains into a single cluster, typically associated with a common attacker, an organization can block all communications to all of the domains in the cluster and/or assign a severity/priority to each of them for further analysis.

Figure 7:
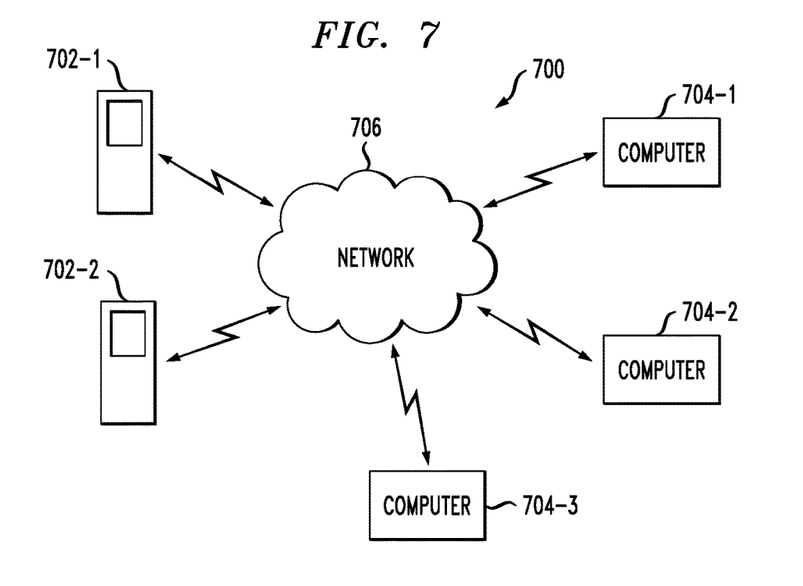
FIG. 7 is a diagram illustrating an example embodiment of communication systems that may incorporate functionality according to one or more embodiments of the invention.

FIG. 7 is a diagram illustrating an example embodiment of communication systems that may incorporate functionality according to one or more embodiments of the invention. As described herein, authentication techniques of the type associated with one or more embodiments of the invention may be implemented in a wide variety of different applications. By way merely of illustration, one exemplary communication system application that may incorporate such techniques will now be described with reference to FIG. 7.

As depicted in FIG. 7, a communication system 700 comprises a plurality of mobile devices 702-1 and 702-2 and computers 704-1, 704-2 and 704-3, configured to communicate with one another over a network 706. Any two or more of the devices 702 and 704 may correspond to devices (such as the feature-based clustering module 100 in FIG. 1) configured to implement at least one embodiment of the invention, as described herein. It is also to be appreciated, however, that the techniques disclosed herein can be implemented in numerous other applications. For example, while FIG. 7 depicts network 706 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, or other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 8:
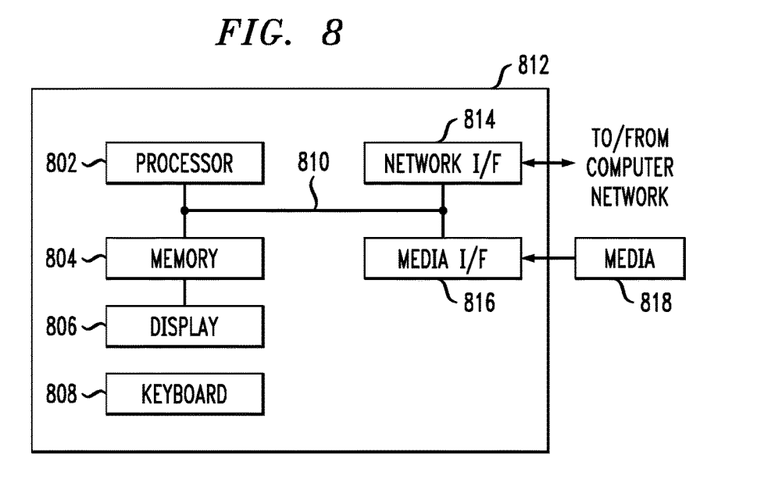
FIG. 8 is a system diagram of an exemplary device on which at least one embodiment of the invention can be implemented.

FIG. 8 is a system diagram of an exemplary device (such as the suspicious domain clustering module 200 in FIGS. 1 and 2, for example) on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 802, memory 804, and input/output interface such as display 806 and keyboard 808 can be interconnected, for example, via bus 810 as part of a data processing unit 812. Suitable interconnections via bus 810, can also be provided to a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from the disclosed suspicious domain clustering techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   obtaining network event data comprising a plurality of network connections;
   identifying users and domain names associated with said network connections in said network event data;
   creating a connection between each user/domain pair that communicate with one another in said identified users and said identified domain names to generate a graph;
   connecting domain names in said graph using inter-domain edges that share common users to obtain a graph of interconnected domains;
   identifying bi-connected components in said graph of interconnected domain names, wherein said bi-connected components comprise node pairs having at least two paths in said graph of interconnected domain names between them; and
   processing said bi-connected components to identify a plurality of suspicious domain names that are likely to participate in a computer security attack.

2. The method of claim 1, wherein the step of connecting domain names in said graph further comprises the step of removing users in said graph.

3. The method of claim 1, wherein the step of connecting domain names using inter-domain edges further comprises connecting two domain names if one or more of two domain names share at least a predefined number of users; share at least a predefined percentage of users; and have a Jaccard index that exceeds a predefined value.

4. The method of claim 3, wherein the inter-domain edges have a weight based on one or more of the predefined number of shared users; predefined percentage of shared users; the Jaccard index and a difference in a suspicious domain score.

5. The method of claim 1, further comprising the step of pruning said graph of interconnected domain names.

6. The method of claim 5, wherein the pruning comprises removing one or more of inter-domain edges between two nodes that do not have a similar predefined common property value and inter-domain edges based on an edge strength.

7. The method of claim 1, further comprising the step of filtering said graph of interconnected domain names.

8. The method of claim 7, wherein the filtering comprises removing one or more of inter-domain edges comprising nodes having zero intersection of neighbors and inter-domain edges comprising node pairs that are not said bi-connected components having at least two paths between them.

9. The method of claim 1, further comprising the step of annotating each of said connections between each user/domain pair with one or more of whether one or more events associated with a given connection is associated with one or more of (i) beaconing communications; (ii) a predefined number of HTTP requests; and (iii) predefined off-work hours.

10. A system, comprising:
    a memory; and
    at least one processing device, coupled to the memory, operative to:
    obtain network event data comprising a plurality of network connections,
    identify users and domain names associated with said network connections in said network event data;

create a connection between each user/domain pair that communicate with one another in said identified users and said identified domain names to generate a graph;
connect domain names in said graph using inter-domain edges that share common users to obtain a graph of interconnected domains;
identify bi-connected components in said graph of interconnected domain names, wherein said bi-connected components comprise node pairs having at least two paths in said graph of interconnected domain names between them; and
process said bi-connected components to identify a plurality of suspicious domain names that are likely to participate in a computer security attack.

11. The system of claim 10, wherein the connecting of said domain names in said graph further comprises removing users in said graph.

12. The system of claim 10, wherein the connecting of said domain names using said inter-domain edges further comprises connecting two domain names if one or more of two domain names share at least a predefined number of users; share at least a predefined percentage of users; and have a Jaccard index that exceeds a predefined value.

13. The system of claim 10, wherein said at least one processing device is further configured to prune said graph of interconnected domain names by removing one or more of inter-domain edges between two nodes that do not have a similar predefined common property value and inter-domain edges based on an edge strength.

14. The system of claim 10, wherein said at least one processing device is further configured to filter said graph of interconnected domain names by removing one or more of inter-domain edges comprising nodes having zero intersection of neighbors and inter-domain edges comprising node pairs that are not said bi-connected components having at least two paths between them.

15. The system of claim 10, wherein said at least one processing device is further configured to annotate each of said connections between each user/domain pair with one or more of whether one or more events associated with a given connection is associated with one or more of (i) beaconing communications; (ii) a predefined number of HTTP requests; and (iii) predefined off-work hours.

16. An article of manufacture comprising a non-transitory machine readable recordable medium containing one or more programs which when executed by at least one processing device implement the steps of:
obtaining network event data comprising a plurality of network connections;
identifying users and domain names associated with said network connections in said network event data;
creating a connection between each user/domain pair that communicate with one another in said identified users and said identified domain names to generate a graph;
connecting domain names in said graph using inter-domain edges that share common users to obtain a graph of interconnected domains;
identifying bi-connected components in said graph of interconnected domain names, wherein said bi-connected components comprise node pairs having at least two paths in said graph of interconnected domain names between them; and
processing said bi-connected components to identify a plurality of suspicious domain names that are likely to participate in a computer security attack.

17. The article of manufacture of claim 16, wherein the step of connecting domain names in said graph further comprises the step of removing users in said graph.

18. The article of manufacture of claim 16, further comprising the step of pruning said graph of interconnected domain names by removing one or more of inter-domain edges between two nodes that do not have a similar predefined common property value and inter-domain edges based on an edge strength.

19. The article of manufacture of claim 16, further comprising the step of filtering said graph of interconnected domain names by removing one or more of inter-domain edges comprising nodes having zero intersection of neighbors and inter-domain edges comprising node pairs that are not said bi-connected components having at least two paths between them.

20. The article of manufacture of claim 16, further comprising the step of annotating each of said connections between each user/domain pair with one or more of whether one or more events associated with a given connection is associated with one or more of (i) beaconing communications; (ii) a predefined number of HTTP requests; and (iii) predefined off-work hours.

* * * * *